(12) United States Patent
Koyama

(10) Patent No.: US 8,681,288 B2
(45) Date of Patent: Mar. 25, 2014

(54) BACKLIGHT UNIT AND DISPLAY DEVICE PROVIDED THEREWITH

(76) Inventor: Yoshihide Koyama, Osaka (JP)

( * ) Notice: Subject to any disclaimer, the term of this patent is extended or adjusted under 35 U.S.C. 154(b) by 197 days.

(21) Appl. No.: 13/509,938

(22) PCT Filed: Aug. 18, 2010

(86) PCT No.: PCT/JP2010/063910
§ 371 (c)(1),
(2), (4) Date: May 16, 2012

(87) PCT Pub. No.: WO2011/058799
PCT Pub. Date: May 19, 2011

(65) Prior Publication Data
US 2012/0224120 A1    Sep. 6, 2012

(30) Foreign Application Priority Data
Nov. 16, 2009  (JP) ................. 2009-260701

(51) Int. Cl.
*G02F 1/1335* (2006.01)
*G09F 13/04* (2006.01)
*F21V 7/04* (2006.01)

(52) U.S. Cl.
USPC .............. 349/61; 349/62; 362/97.2; 362/607

(58) Field of Classification Search
CPC .............. G02F 1/133608; G02F 1/133605; G02F 1/133615; G02F 1/133603; G02F 1/133604; G02F 1/133607; G02F 2001/133607; G02B 6/0053; G02B 6/0031

USPC ............... 349/61, 62; 362/97.2, 607
See application file for complete search history.

(56) References Cited

U.S. PATENT DOCUMENTS

| 7,980,714 B2 * | 7/2011 | Itaya ............... 362/97.1 |
| 8,144,287 B2 * | 3/2012 | Kamada ............ 349/65 |
| 2010/0097524 A1 * | 4/2010 | Kuromizu ........... 348/553 |
| 2010/0171898 A1 * | 7/2010 | Lee ................. 349/58 |

FOREIGN PATENT DOCUMENTS

| JP | 2005-99461 A | 4/2005 |
| JP | 2007-79027 A | 3/2007 |
| JP | 2007-232809 A | 9/2007 |
| JP | 2008-84537 A | 4/2008 |
| JP | 2008-248226 A | 10/2008 |
| JP | 2008-281835 A | 11/2008 |

* cited by examiner

*Primary Examiner* — Mike Qi
(74) *Attorney, Agent, or Firm* — Chen Yoshimura LLP

(57) ABSTRACT

Provided is a backlight unit that is capable of suppressing an uneven brightness. The backlight unit (2) includes a lower lens sheet (91) and an upper lens sheet (92) that are disposed in an inside area of a frame portion of a frame (4) and that are laminated in this order, and a rim tape (10) attached to the frame portion of the frame (4). The upper lens sheet (92) is fixed in position by a wide portion (10a) of the rim tape (10) being affixed to the upper surface of an end (92b) of the upper lens sheet (92), while the lower lens sheet (91) is held without being affixed to the wide portion (10a) of the rim tape (10).

8 Claims, 7 Drawing Sheets

BACKLIGHT UNIT AND DISPLAY DEVICE PROVIDED THEREWITH

TECHNICAL FIELD

The present invention relates to a backlight unit and a display device provided with the backlight unit.

BACKGROUND ART

A liquid crystal display device, which is a type of display devices, is equipped with a backlight unit because a liquid crystal display panel provided therein for displaying an image does not emit light. The backlight unit is mounted on a rear surface (a surface opposite to a display surface of the liquid crystal display panel) of the liquid crystal display panel, and by illuminating the liquid crystal display panel with the backlight unit, the display operation is performed.

The backlight unit for the liquid crystal display device is broadly categorized into two types: the direct lighting type and the edge lighting type.

In the direct lighting type backlight unit, a light source is provided immediately below the liquid crystal display panel. Such a direct lighting type backlight unit is suitable for illuminating a large area with high output power, and is therefore mainly used for a large liquid crystal display device.

On the other hand, in the edge lighting type backlight unit, a light guide plate is provided immediately below the liquid crystal display panel, and a light source is arranged so as to face an end surface of the light guide plate on a prescribed side. Typically, a light diffusion sheet for diffusing light and a lens sheet for collecting light are disposed on an upper surface (surface facing the liquid crystal display panel) of the light guide plate, and these light diffusion sheet and lens sheet are fixed in position by an adhesive tape. Such an edge lighting type backlight unit has an advantage of providing a thinner profile than that of the direct lighting type backlight unit.

The illumination operation of the edge lighting type backlight unit is performed as follows. When light is generated by the light source, the light from the light source enters the light guide plate through the end surface of the light guide plate on the prescribed side. The light that has entered the light guide plate is emitted through the upper surface of the light guide plate, and by passing through the light diffusion sheet and the lens sheet, the light illuminates the liquid crystal display panel (see Patent Document 1, for example).

In recent years, a thinner liquid crystal display device has been sought after, creating a stronger demand for the backlight unit having even thinner components. As for the lens sheet, which is a component of the backlight unit, for example, the thickness thereof needs to be reduced by about half (from about 100 μm to about 50 μm, for example).

RELATED ART DOCUMENTS

Patent Documents

Patent Document 1: Japanese Patent Application Laid-Open Publication No. 2008-84537

SUMMARY OF THE INVENTION

Problems to be Solved by the Invention

Conventionally, a problem of warping of the lens sheet has been addressed by adjusting material properties (elastic modulus of an adhesive material) of an adhesive tape used to fix the lens sheet in position. However, as the thickness of the lens sheet has been further reduced, it has become more difficult to reduce the warping of the lens sheet by simply adjusting the material properties of the adhesive tape. Therefore, the conventional configuration had a problem in that when the thickness of the lens sheet is further reduced, the warping of the lens sheet cannot be prevented, resulting in an occurrence of uneven brightness along the warping of the lens sheet, which can be visually recognized.

The present invention was made to solve the above-mentioned problem, and an object of the present invention is to provide a backlight unit and a display device that can reduce uneven brightness.

Means for Solving the Problems

In order to achieve the above-mentioned object, a backlight unit according to a first aspect of the present invention includes: a frame having a frame portion; lens sheets disposed in an inside area of the frame portion of the frame, the lens sheets including a lower lens sheet and an upper lens sheet laminated in this order; and a first adhesive tape that is attached to the frame portion of the frame. A portion of the first adhesive tape on a prescribed side is extended to cover an upper surface of an end of the upper lens sheet on the prescribed side, and the upper lens sheet is fixed in position by the portion of the first adhesive tape on the prescribed side being affixed to the upper surface of the end of the upper lens sheet on the prescribed side, while the lower lens sheet is held without being affixed to the portion of the first adhesive tape on the prescribed side.

In the backlight unit according to the first aspect, as described above, the upper lens sheet is fixed in position by the portion of the first adhesive tape on the prescribed side being affixed to the upper surface of the end of the upper lens sheet on the prescribed side, while the lower lens sheet is held without being affixed to the portion of the first adhesive tape on the prescribed side. This way, because the lower lens sheet is not fixed in position by another member, even if the lower lens sheet is expanded under a high temperature and high humidity environment, the expansion of the lower lens sheet is not hindered. This allows for a suppression of the warping of the lower lens sheet when the lower lens sheet is expanded. Because the warping of the lower lens sheet is suppressed, the warping of the upper lens sheet overlying the lower lens sheet is reduced. Thus, it becomes possible to suppress the warping of the lens sheet, thereby preventing an uneven brightness from occurring along the warping of the lens sheet and thereby being visually recognized.

In the backlight unit according to the first aspect, the upper surface of the end of the lower lens sheet on the prescribed side is preferably covered by the upper lens sheet. With this configuration, the upper surface of the end of the lower lens sheet on the prescribed side is not exposed, and therefore, even though the portion of the first adhesive tape on the prescribed side is extended to cover the upper surface of the end of the upper lens sheet on the prescribed side, the portion of the first adhesive tape on the prescribed side is not affixed to the upper surface of the end of the lower lens sheet on the prescribed side. This makes it possible to prevent the lower lens sheet from being fixed in position.

In the configuration that the upper surface of the end of the lower lens sheet on the prescribed side is covered by the upper lens sheet, the end of the lower lens sheet on the prescribed side is preferably placed further back from the end of the upper lens sheet on the prescribed side. With this configuration, the upper surface of the end of the lower lens sheet on the prescribed side can be covered by the upper lens sheet with ease, thereby preventing the upper surface of the end of the lower lens sheet on the prescribed side from being exposed. That is, it becomes possible to easily prevent the portion of the first adhesive tape on the prescribed side from being affixed to the upper surface of the end of the lower lens sheet on the prescribed side (thereby fixing the lower lens sheet in position).

In the backlight unit according to the first aspect, a relief portion is preferably formed in the frame portion of the frame, and a protrusion that engages the relief portion of the frame is preferably formed on an outer edge of the lens sheet. It is also preferable that the lower lens sheet and the upper lens sheet respectively have two protrusions that are arranged diagonally along a lens direction thereof. The lens direction of the lens sheet refers to a direction in which elongated lens portions formed on the lens sheet are extended. In this direction, the lens sheet expands or contracts in accordance with changes in ambient temperature or humidity. With this configuration, the protrusions can be used to confirm the front and back sides, proper combinations of sheets, or the like of the lower lens sheet and the upper lens sheet, thereby eliminating an erroneous arrangement of the lower lens sheet and the upper lens sheet. Also, in this configuration, the two protrusions of the lower lens sheet are arranged diagonally along the lens direction of the lower lens sheet, and therefore, even though the two protrusions are formed in the lower lens sheet, when the expansion of the lower lens sheet occurs, the expansion of the lower lens sheet is not hindered by these two protrusions. This allows for a suppression of the warping of the lower lens sheet. The similar effects can be achieved in the upper lens sheet.

The backlight unit according to the first aspect preferably further includes a light diffusion sheet that is arranged in the inside area of the frame portion of the frame, and a second adhesive tape that is attached to an upper surface of an end of the light diffusion sheet on the prescribed side. It is also preferable that the lower lens sheet and the upper lens sheet be laminated on the upper surface of the light diffusion sheet in this order, and the light diffusion sheet be fixed in position by the second adhesive tape. With this configuration, the light diffusion sheet can be fixed in position with ease, and a light leakage can be prevented.

In the configuration where the second adhesive tape is attached to the upper surface of an end of the light diffusion sheet on the prescribed side, it is preferable that the second adhesive tape attached to the upper surface of the end of the light diffusion sheet on the prescribed side create a step on the upper surface of an end of the light diffusion sheet on the prescribed side, and that the step created on the upper surface of the end of the light diffusion sheet on the prescribed side prevent the lower lens sheet that is disposed on the upper surface of the light diffusion sheet from moving toward the prescribed side. With this configuration, the lower lens sheet can be prevented from moving toward the prescribed side, and is not affixed to the portion of the first adhesive tape on the prescribed side.

It is also preferable that the backlight unit according to the first aspect further includes a light guide plate that is disposed in the inside area of the frame portion of the frame and that has an end surface on a prescribed side serving as a light incident surface, and a light source that is disposed so as to face the light incident surface of the light guide plate. It is preferable that the lower lens sheet and the upper lens sheet be laminated in this order on an upper surface of the light guide plate, and the portion of the first adhesive tape on the prescribed side be placed on a side closer to the light source.

A display device according to a second aspect of the present invention includes the backlight unit according to the first aspect and a display panel that is illuminated by light from the backlight unit. This configuration makes it possible to reduce an uneven brightness with ease.

Effects of the Invention

As described above, according to the present invention, it becomes possible to provide a backlight unit and a display device that can suppress an uneven brightness with ease.

DETAILED DESCRIPTION OF EMBODIMENTS

A configuration of a display device of this embodiment will be explained in detail below with reference to FIGS. 1 to 7.

Figure 1:
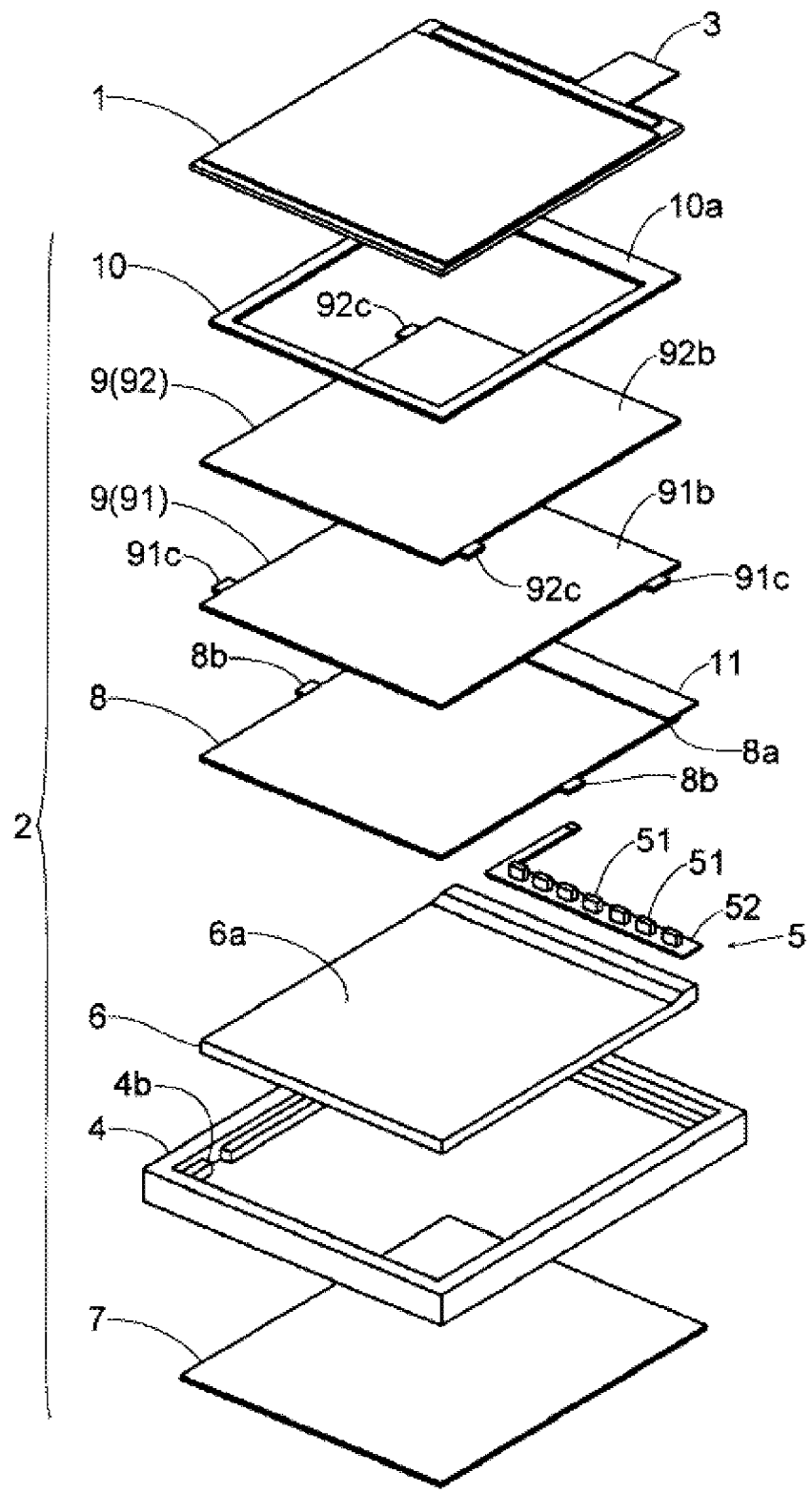
FIG. 1 is an exploded perspective view of a liquid crystal display device that has a backlight unit according to an embodiment of the present invention.
Figure 2:
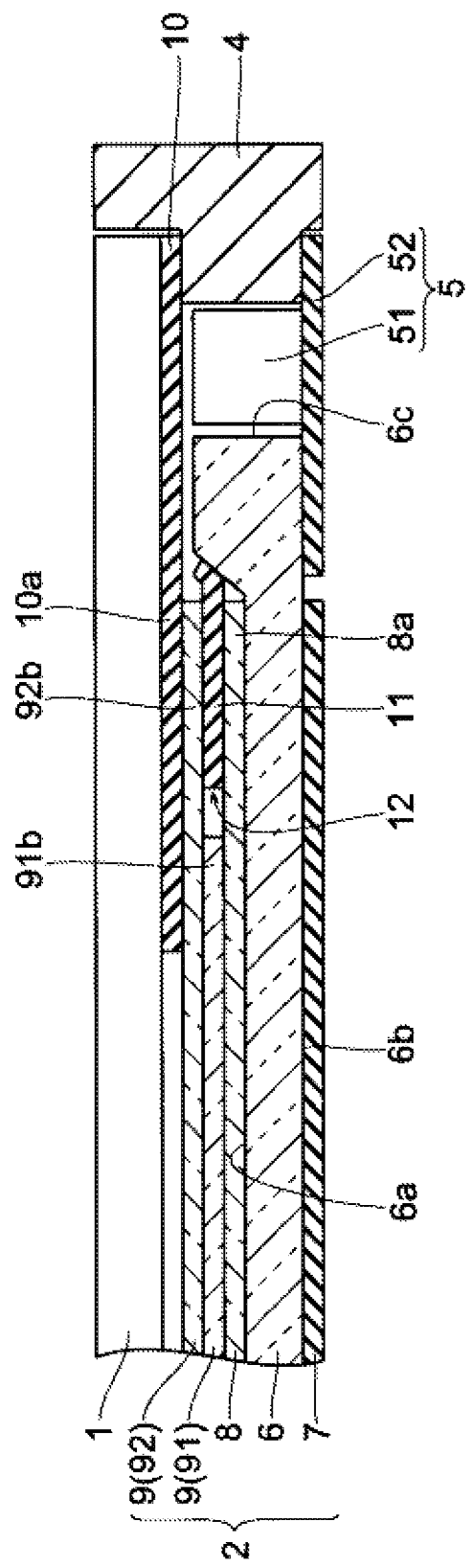
FIG. 2 is an enlarged cross-sectional view of a portion of the liquid crystal display device that has the backlight unit according to an embodiment of the present invention.

The display device of this embodiment is a liquid crystal display device that includes a liquid crystal display panel 1 that has a display surface, an edge lighting type backlight unit 2 that is mounted on a rear surface (surface opposite to the display surface) of the liquid crystal display panel 1, and the like as shown in FIGS. 1 and 2. The liquid crystal display panel 1 is an example of the "display panel" of the present invention.

The liquid crystal display panel 1 at least includes a liquid crystal layer, a pair of glass substrates, and polarizing plates. The pair of glass substrates are bonded together by a sealing material, and the liquid crystal layer is sandwiched therebetween. The polarizing plates are provided on respective surfaces of the pair of glass substrates on the opposite sides to the liquid crystal layer sides, respectively. The liquid crystal display panel 1 has an FPC (flexible printed circuit) 3 connected thereto, and the FPC 3 is connected to a driver circuit (not shown).

The backlight unit 2 at least includes a frame 4, a light-emitting module 5, a light guide plate 6, a light reflective sheet 7, a light diffusion sheet 8, and lens sheets 9. The light-emitting module 5 is an example of the "light source" of the present invention.

Figure 3:
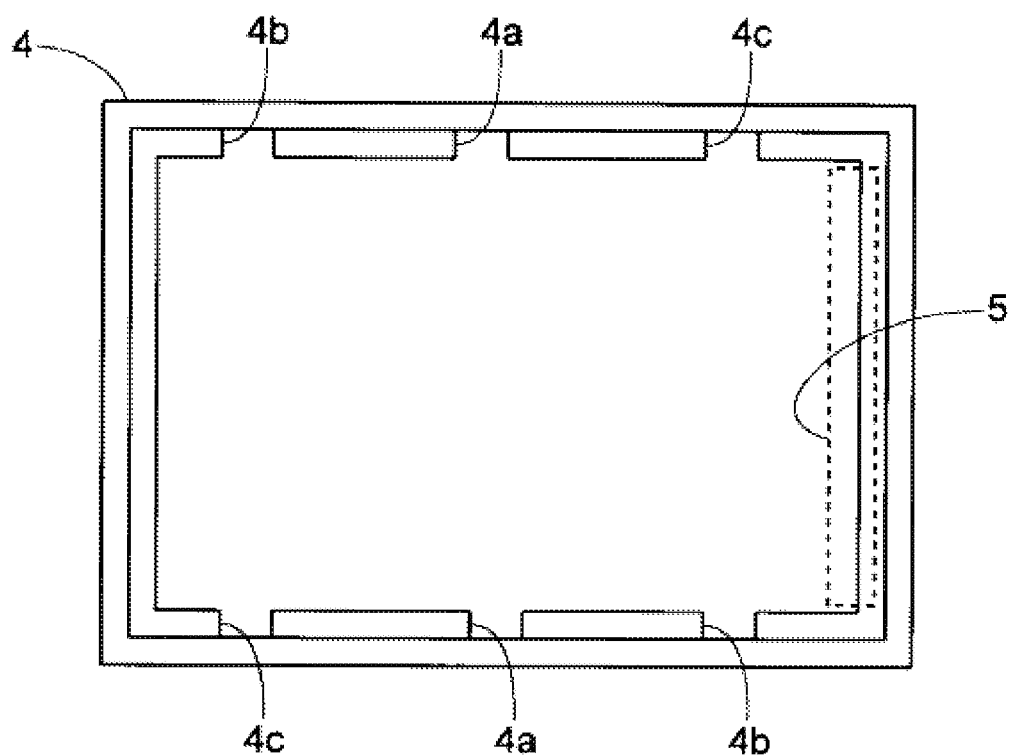
FIG. 3 is a plan view showing a frame of the backlight unit according to an embodiment of the present invention.
Figure 4:
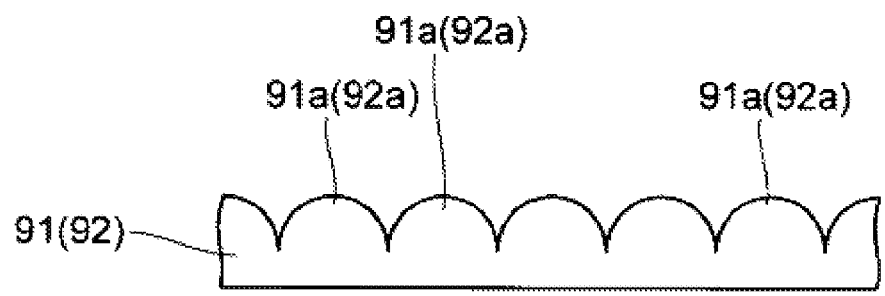
FIG. 4 is an enlarged cross-sectional view of a portion of a lens sheet of the backlight unit according to an embodiment of the present invention.

The frame 4 has a frame portion that is formed in a frame shape, and the inside area of the frame portion is formed so as to be substantially rectangular. The light-emitting module 5, the light guide plate 6, the light reflective sheet 7, the light diffusion sheet 8, and the lens sheets 9 are placed in the inside area of the frame portion of the frame 4. As shown in FIG. 3, in the frame portion of the frame 4, groove-shape relief sections 4a, 4b, and 4c are formed on inner walls of the longer sides thereof.

As shown in FIGS. 1 and 2, the light-emitting module 5 includes a plurality of LEDs (light-emitting diodes) 51, and is formed as a module by mounting the plurality of LEDs 51 on a single FPC 52. This light-emitting module 5 is arranged along one inner wall on a prescribed side of the inside area of the frame portion of the frame 4. In the explanation below, the prescribed side, that is, the side where the light-emitting module 5 is disposed will be referred to as a "side close to the light-emitting module 5."

The light guide plate 6 has an upper surface 6a, a rear surface 6b that is a surface on a side opposite to the upper surface 6a, and side surfaces continuing to the upper surface 6a and the rear surface 6b. The light guide plate 6 is formed in a substantially rectangular shape (a shape that allows the light guide plate 6 to be placed in the inside area of the frame portion of the frame 4) in a plan view. Among the side surfaces of the light guide plate 6, a prescribed side surface 6c faces the light-emitting module 5, and the upper surface 6a of the light guide plate 6 faces the liquid crystal display panel 1. That is, the prescribed side surface 6c of the light guide plate 6 is a light incident surface (a surface through which light emitted from the light-emitting module 5 enters the light guide plate 6), and the upper face 6a of the light guide plate 6 is a light emerging surface (a surface through which the light that has entered the light guide plate 6 is emitted toward the liquid crystal display panel 1).

When the thickness of a portion of the light guide plate 6 near the light-emitting module 5 and the thickness of the rest of the plate are compared, the thickness of the rest of the plate is made smaller. The light guide plate 6 is configured in this manner so as to achieve the thickness reduction of the backlight unit 2 without reducing the amount of light that enters the light guide plate 6 through the prescribed side face (light incident surface) 6c of the light guide plate 6.

The light reflective sheet 7 is disposed on the rear surface 6b of the light guide plate 6 so as to cover the rear surface 6b of the light guide plate 6. By having such a light reflective sheet 7, the rear surface 6b of the light guide plate 6 becomes a light reflective surface, and therefore, it becomes possible to suppress a light leakage from the rear surface 6b of the light guide plate 6, resulting in improvement of the light utilization efficiency.

The light diffusion sheet 8 is formed in a substantially rectangular shape (a shape that allows the light diffusion sheet 8 to be placed in the inside area of the frame portion of the frame 4) in a plan view, and is disposed on the upper surface (light emerging surface) 6a of the light guide plate 6. This allows the light diffusion sheet 8 to diffuse light that has been emitted through the upper face (light emerging surface) 6a of the light guide plate 6.

The lens sheets 9 are formed in a substantially rectangular shape (a shape that allows the lens sheets 9 to be placed in the inside area of the frame portion of the frame 4) in a plan view, and are disposed on an upper surface of the light diffusion sheet 8. This allows the lens sheets 9 to collect light that has passed through the light diffusion sheet 8.

Figure 5:
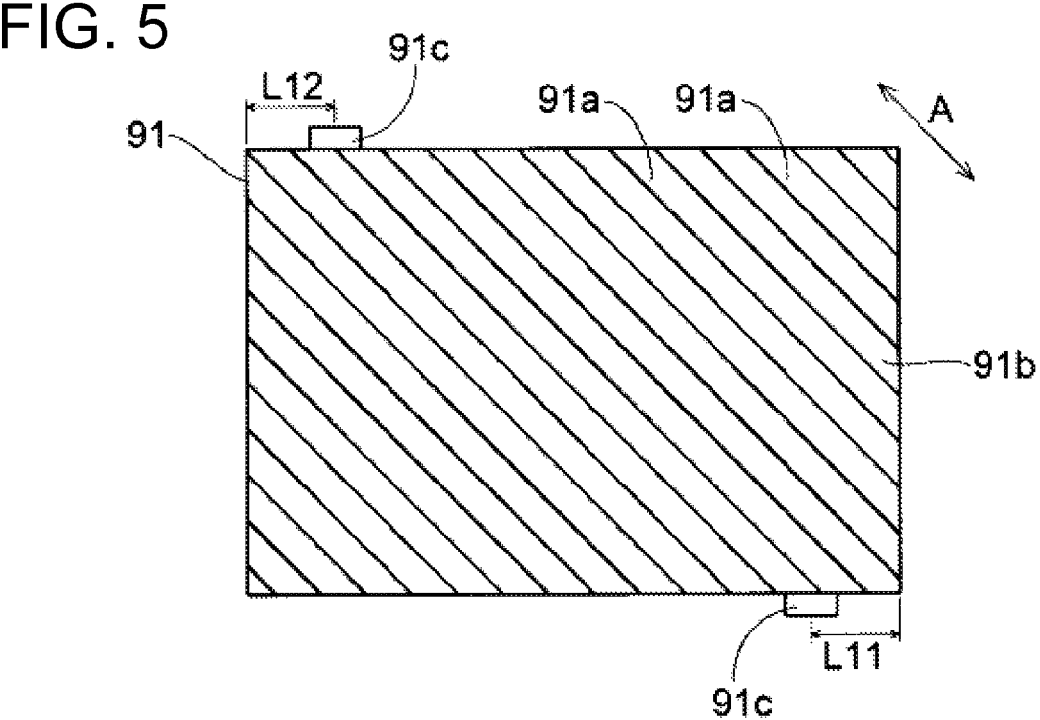
FIG. 5 is a plan view of a lower lens sheet of the backlight unit according to an embodiment of the present invention.
Figure 6:
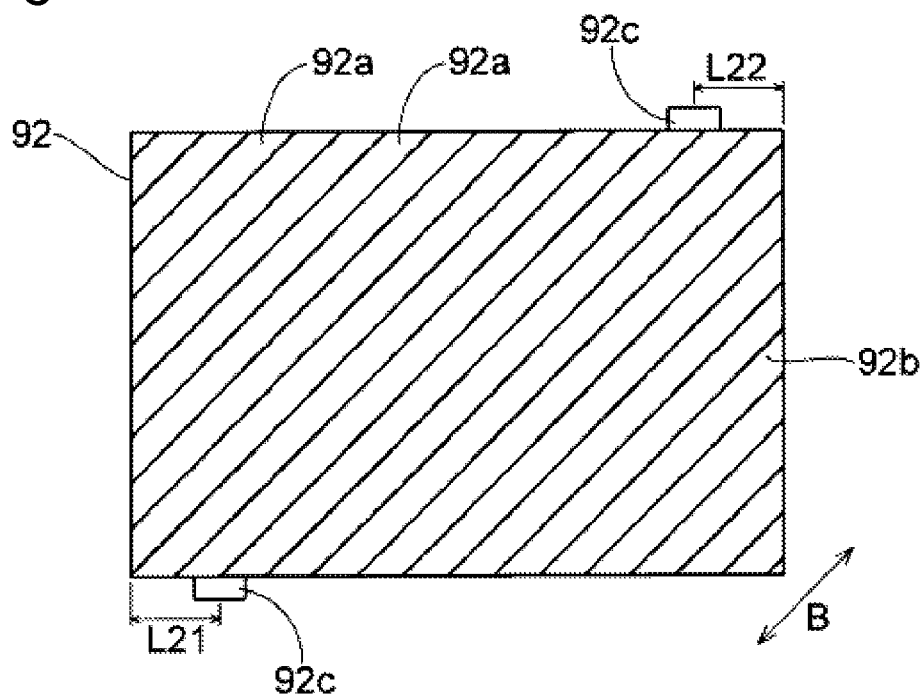
FIG. 6 is a plan view of an upper lens sheet of the backlight unit according to an embodiment of the present invention.

This lens sheets 9 are made of two lens sheets (a lower lens sheet 91 and an upper lens sheet 92) that are laminated in this order. The lower lens sheet 91 and the upper lens sheet 92 have a plurality of dome-shaped (a shape illustrated in FIG. 4) lens portions 91a and lens portions 92a, respectively. As shown in FIG. 5, the lens portions 91a of the lower lens sheet 91 are formed so as be elongated in a prescribed oblique direction (A direction). As shown in FIG. 6, the lens portions 92a of the upper lens sheet 92 are formed so as to be elongated in a direction (B direction) that is perpendicular to the prescribed oblique direction. With such lens portions 91a and 92a being formed on the lower lens sheet 91 and the upper lens sheet 92, respectively, when changes in ambient temperature or humidity occur, the lower lens sheet 91 expands or contracts in the A direction, which is the lens direction thereof, and the upper lens sheet 92 expands or contracts in the B direction, which is the lens direction thereof.

As shown in FIGS. 1 and 2, a rim tape 10 is attached to the frame portion of the frame 4. The rim tape 10 can shield light and is formed in a frame shape that corresponds to the frame portion of the frame 4. By making the liquid crystal display panel 1 attached to the rim tape 10, the liquid crystal display panel 1 and the backlight unit 2 are firmly bonded together. Further, a portion of the rim tape 10 on the side close to the light-emitting module 5 forms a wide portion 10a that is wider than other portions, and the wide portion 10a of the rim tape 10 is covering the light-emitting module 5. In this way, light from the light-emitting module 5 is blocked by the wide portion 10a of the rim tape 10, thereby suppressing a light leakage. The rim tape 10 is an example of the "first adhesive tape" of the present invention, and the wide portion 10a is an example of the "portion on the prescribed side" of the present invention.

In this embodiment, the wide portion 10a of the rim tape 10 is extended so as to cover an upper surface of an end 92b of the upper lens sheet 92 on the side close to the light-emitting module 5. By making the wide portion 10a of the rim tape 10 attached to the upper surface of the end 92b of the upper lens sheet 92, the upper lens sheet 92 is fixed in position. On the other hand, the lower lens sheet 91 is held without having an end 91b thereof on the side close to the light-emitting module 5 attached to the wide portion 10a of the rim tape 10.

Specifically, the end 91b of the lower lens sheet 91 is located further back from the end 92b of the upper lens sheet 92, and therefore, an upper surface of the end 91b of the lower lens sheet 91 is completely covered by the upper lens sheet 92. That is, the upper surface of the end 91b of the lower lens sheet 91 is not exposed. Thus, even though the wide portion 10a of the rim tape 10 is extended so as to cover the upper surface of the end 92b of the upper lens sheet 92, the wide portion 10a of the rim tape 10 is not attached to the upper surface of the end 91b of the lower lens sheet 91.

In this embodiment, in addition to the rim tape 10, a fastening tape 11 is further provided. This light-shielding fastening tape is attached to an upper surface of an end 8a of the light diffusion sheet 8 on the side close to the light-emitting module 5. This fastening tape 11 is attached to the light guide plate 6, thereby fixing the light diffusion sheet 8 in position. The fastening tape 11 is an example of the "second adhesive tape" of the present invention.

By the fastening tape 11 that is attached to the upper surface of the end 8a of the light diffusion sheet 8, a step 12 is created on the upper surface of the end 8a of the light diffusion sheet 8. This step 12 prevents the lower lens sheet 91 disposed on the upper surface of the light diffusion sheet 8 from moving toward the light-emitting module 5.

The optical sheets (light diffusion sheet 8 and lens sheets 9) that are used for the backlight unit 2 of this embodiment have the following configurations so as to prevent an erroneous placement, i.e., being placed upside down.

Figure 7:
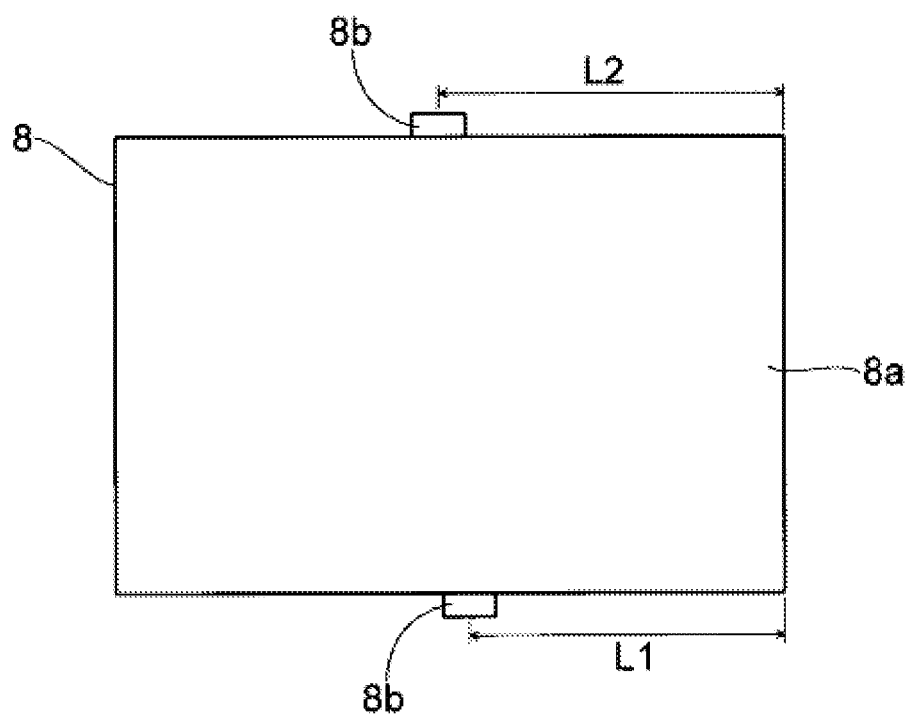
FIG. 7 is a plan view of a light diffusion sheet of the backlight unit according to an embodiment of the present invention.

That is, as shown in FIG. 7, in the light diffusion sheet 8, protrusions 8*b* that protrude outward are provided on respective outer edges of the pair of longer sides. When the light diffusion sheet 8 is placed in the inside area of the frame portion of the frame 4, these protrusions 8*b* of the light diffusion sheet 8 engage the relief portions 4*a* (see FIG. 3) of the frame 4, respectively. In other words, in placing the light diffusion sheet 8 in the inside area of the frame portion of the frame 4, the light diffusion sheet 8 does not properly sit in the inside area of the frame portion of the frame 4 unless the protrusions 8*b* of the light diffusion sheet 8 engage the relief portions 4*a* of the frame 4. One protrusion 8*b* of the two protrusions 8*b* of the light diffusion sheet 8 is formed at a position that is about 34 mm (distance L1) from an edge on the end 8*a* side (the side close to the light-emitting module 5), and the other protrusion 8*b* is formed at a position that is about 40 mm (distance L2) from the edge on the end 8*a* side (the side close to the light-emitting module 5), for example.

As shown in FIG. 5, in the lower lens sheet 91, protrusions 91*c* are provided on respective outer edges of the pair of longer sides, and these protrusions 91*c* engage the relief portions 4*b* (see FIG. 3) of the frame 4. As shown in FIG. 6, in the upper lens sheet 92, protrusions 92*c* are provided on respective outer edge of the pair of longer sides, and these protrusions 92*c* engage the relief portions 4*c* (see FIG. 3) of the frame 4.

In this embodiment, as shown in FIG. 5, one protrusion 91*c* of the two protrusions 91*c* of the lower lens sheet 91 is formed on the side close to the end 91*b* (the side close to the light-emitting module 5), and the other protrusion 91*c* is formed on a side opposite to the side close to the end 91*b* (the side close to the light-emitting module 5). Respective distances from the center of the lower lens sheet 91 to the one protrusion 91*c* and to the other protrusion 91*c* are substantially the same. Further, these two protrusions 91*c* of the lower lens sheet 91 are arranged diagonally along the lens direction (A direction), which is the direction in which the lower lens sheet 91 expands or contracts. The one protrusion 91*c* of the two protrusions 91*c* of the lower lens sheet 91 is formed at a position that is about 20 mm (distance L11) from an edge on the end 91*b* side (the side close to the light-emitting module 5), and the other protrusion 91*c* is formed at a position that is about 20 mm (distance L12) from an edge on the side opposite to the side of the end 91*b* (the side close to the light-emitting module 5), for example.

As shown in FIG. 6, the upper lens sheet 92 is configured in a similar manner. One protrusion 92*c* of two protrusions 92*c* of the upper lens sheet 92 is formed on a side opposite to the side close to the end 92*b* (the side close to the light-emitting module 5), and the other protrusion 92*c* is formed on the side close to the end 92*b* (the side close to the light-emitting module 5). Respective distances from the center of the upper lens sheet 92 to the one protrusion 92*c* and to the other protrusion 92*c* are substantially the same. Further, these two protrusions 92*c* of the upper lens sheet 92 are arranged diagonally along the lens direction (B direction), which is the direction in which the upper lens sheet 92 expands or contracts. The one protrusion 92*c* of the two protrusions 92*c* of the upper lens sheet 92 is formed at a position that is about 20 mm (distance L21) from an edge on the side opposite to the end 92*b* side (the side close to the light-emitting module 5), and the other protrusion 92*c* is formed at a position that is about 20 mm (distance L22) from an edge on the end 92*b* side (the side close to the light-emitting module 5), for example.

As described above, in this embodiment, the wide portion 10*a* of the rim tape 10 is affixed to the upper surface of the end 92*b* of the upper lens sheet 92 on the side close to the light-emitting module 5, thereby fixing the upper lens sheet 92 in position. On the other hand, the lower lens sheet 91 is held without being attached to the wide portion 10*a* of the rim tape 10, and therefore, the lower lens sheet 91 is not fixed in position by another member. With this configuration, even when the lower lens sheet 91 is expanded under a high temperature and high humidity environment, the expansion of the lower lens sheet 91 is not hindered. This allows for a suppression of the warping of the lower lens sheet 91 even when the lower lens sheet 91 is expanded. Because the warping of the lower lens sheet 91 is suppressed, the warping of the upper lens sheet 92 overlying the lower lens sheet 91 is reduced. Thus, it becomes possible to suppress the warping of the lens sheets 9, which prevents the uneven brightness from occurring along the warping of the lens sheets 9 and thereby being visually recognized.

As described above, in this embodiment, the upper surface of the end 91*b* of the lower lens sheet 91 on the side close to the light-emitting module 5 is covered by the upper lens sheet 92, and therefore, the upper surface of the end 91*b* of the lower lens sheet 91 on the side close to the light emitting module 5 is not exposed. Thus, even though the wide portion 10*a* of the rim tape 10 is extended to cover the upper surface of the end 92*b* of the upper lens sheet 92 on the side close to the light-emitting module 5, the wide portion 10*a* of the rim tape 10 is not affixed to the upper surface of the end 91*b* of the lower lens sheet 91 on the side close to the light emitting module 5. This makes it possible to prevent the lower lens sheet 91 from being fixed in position.

In this case, by disposing the lower lens sheets 91 such that the end 91*b* thereof on the side close to the light-emitting module 5 is located further back from the end 92*b* of the upper lens sheet 92 on the side close to the light-emitting module 5, the upper surface of the end 91*b* of the lower lens sheet 91 on the side close to the light-emitting module 5 can easily be covered with the upper lens sheet 92, which prevents the upper surface of the end 91*b* of the lower lens sheet 91 on the side close to the light-emitting module 5 from being exposed. That is, it becomes possible to prevent the wide portion 10*a* of the rim tape 10 from being affixed to the upper surface of the end 91*b* of the lower lens sheet 91 on the side close to the light-emitting module 5 (thereby fixing the lower lens sheet 91 in position) with ease.

As described above, in this embodiment, the two protrusions 91*c* of the lower lens sheet 91 are arranged diagonally along the lens direction. This way, when the lower lens sheet 91 is expanded, the expansion of the lower lens sheet 91 is not hindered by the protrusions 91*c*, which can suppress the warping of the lower lens sheet 91. The similar effect can be achieved in the upper lens sheet 92. It should be noted that the light diffusion sheet 8 does not have the expansion or contraction direction, and therefore, there is no need to take into account the expansion or contraction direction in determining the positions of the protrusions 8*b* of the light diffusion sheet 8.

As described above, in this embodiment, the distances from the center of the lower lens sheet 91 to the one protrusion 91*c* and the distance from the center of the lower lens sheet 91 to the other protrusion 91*c* are the same. This makes it possible to suppress a curling deformation of the lower lens sheet 91. The similar effect can be achieved in the upper lens sheet 92.

As described above, in this embodiment, the fastening tape 11 that is attached to the upper surface of the end 8a of the light diffusion sheet 8 on the side close to the light-emitting module 5 is further provided. This makes it possible not only to fix the light diffusion sheet 8 in position with ease, but also to prevent the light leakage.

Further, when the fastening tape 11 is attached to the upper surface of the end 8a of the light diffusion sheet 8 on the side close to the light-emitting module 5, the step 12 is created on the upper surface of the end 8a of the light diffusion sheet 8 on the side close to the light-emitting module 5, and this step keeps the lower lens sheet 91 from moving toward the light-emitting module 5. This makes it possible to prevent the lower lens sheet 91 from moving toward the light-emitting module 5, and from thereby being attached to the wide portion 10a of the rim tape 10.

Below, a confirmation study that was conducted to confirm the above-mentioned effects will be explained.

In this confirmation study, first, a liquid crystal display device that has the same configuration as that of the above-mentioned embodiment was prepared as a working example, and a liquid crystal display device that has the same configuration as that of the above-mentioned embodiment, except that a lower lens sheet is fixed in position, was prepared as a comparison example. Thereafter, the respective liquid crystal display devices of the working example and the comparison example underwent 100 cycles of a cooling and heating where cooling at −30° C. (duration: 30 min) and heating at 85° C. (duration: 30 min) are repeatedly performed.

The result of the cooling and heating cycle study shows that the warping that occurred in the lens sheet of the working example became smaller than the warping that occurred in the lens sheet of the comparison example. From this result, it can be understood that because the lower lens sheet was not fixed in position in the working example, the expansion of the lower lens sheet and the expansion of the upper lens sheet were not hindered, respectively, resulting in the smaller warping of the lens sheet. On the other hand, in the comparison example, because the lower lens sheet was fixed in position, the expansion of the lower lens sheet and the expansion of the upper lens sheet were hindered, respectively, causing the greater warping to occur in the lens sheets.

Another confirmation study was conducted to confirm the above-mentioned effects as follows.

Figure 8:
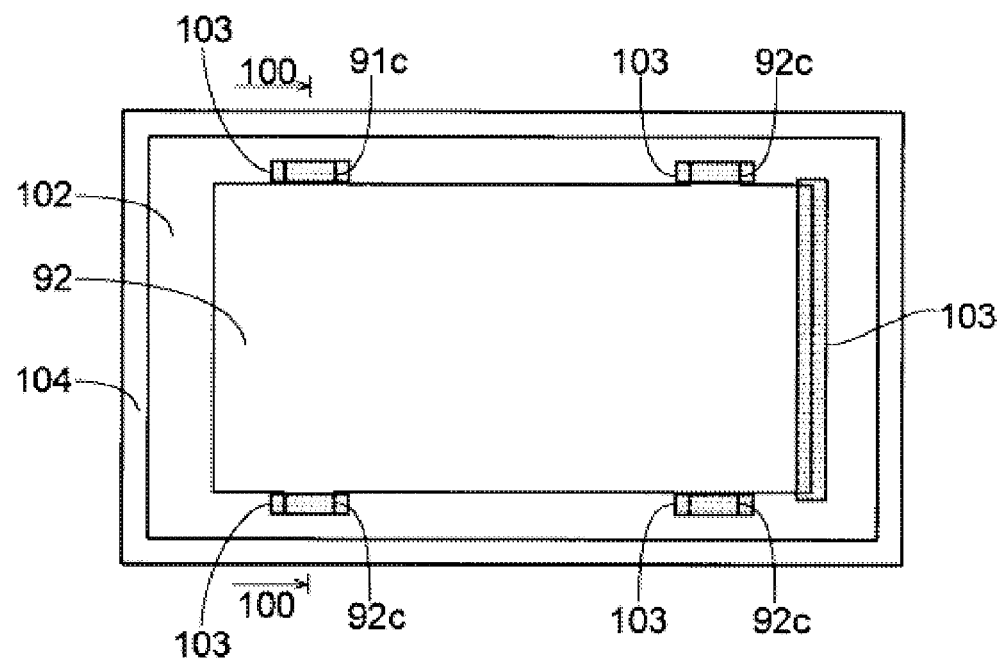
FIG. 8 is an explanatory diagram for a confirmation study performed to confirm effects of the present invention.
Figure 9:
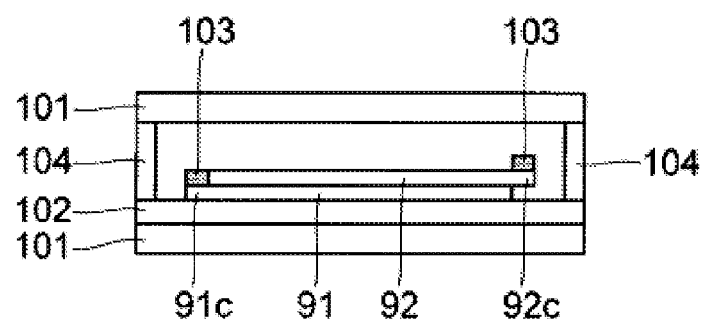
FIG. 9 is an explanatory diagram (a diagram corresponding to a cross-section along the line 100-100 in FIG. 8) for the confirmation study performed to confirm effects of the present invention.

In this confirmation study, first, a component shown in FIGS. 8 and 9 was prepared as a working example.

Specifically, on a 70 mm×100 mm glass substrate 101, a polarizing plate 102 with an AG coating is disposed. On the polarizing plate 102, a lower lens sheet 91 and an upper lens sheet 92 that are respectively 50 mm×75 mm are disposed in this order. The lower lens sheet 91 and the upper lens sheet 92 used here are the same as the lower lens sheet 91 and the upper lens sheet 92 shown in FIGS. 5 and 6. Respective protrusions 91c and 92c of the lower lens sheet 91 and the upper lens sheet 92 are fastened by adhesive tapes 103, and a portion of one of the shorter sides is also fastened by the adhesive tape 103. A 30 μm-thick spacer 104 is provided on the polarizing plate 102, and a glass substrate 101 is further provided thereon.

Figure 10:
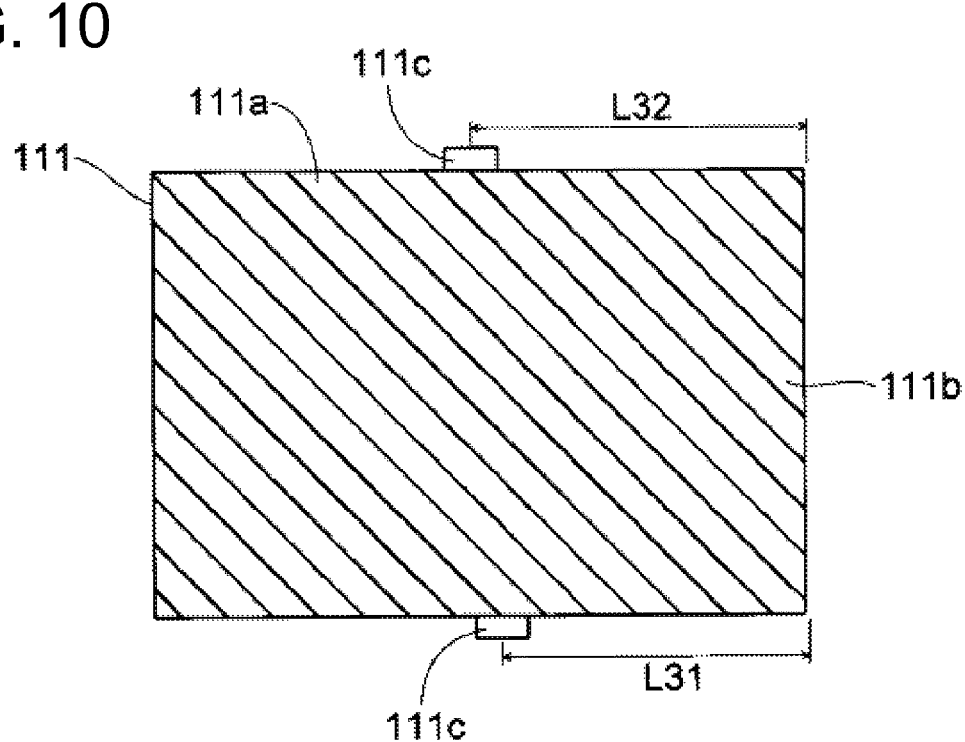
FIG. 10 is an explanatory diagram (a plan view of a lower lens sheet in a comparison example) for the confirmation study performed to confirm effects of the present invention.
Figure 11:
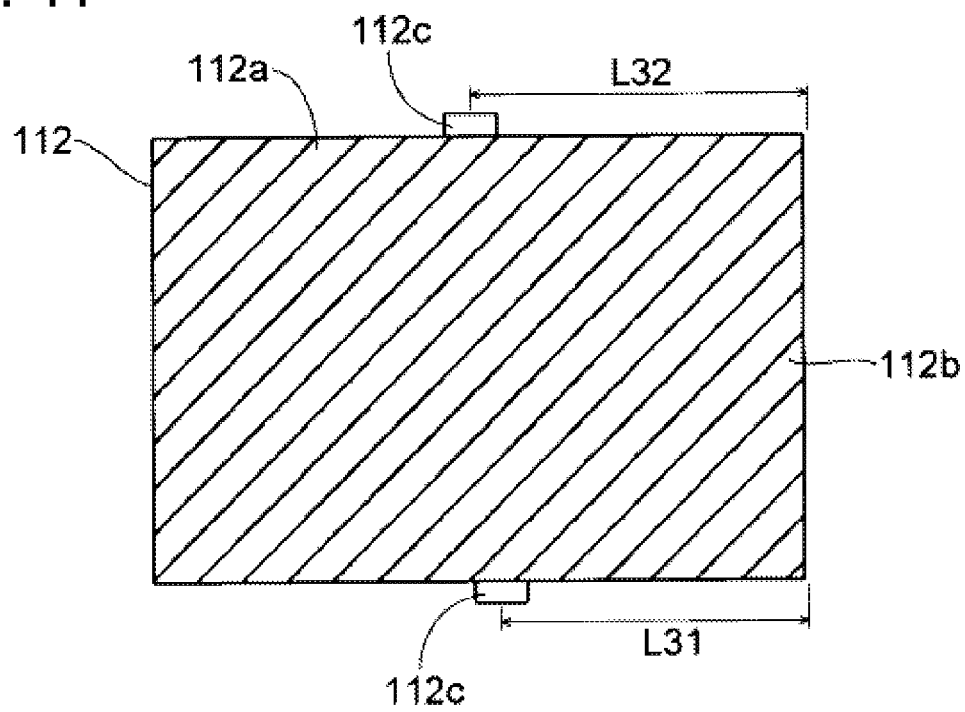
FIG. 11 is an explanatory diagram (a plan view of an upper lens sheet in the comparison example) for the confirmation study performed to confirm effects of the present invention.

As a comparison example, a component similar to that of FIGS. 8 and 9 was prepared by using a lower lens sheet 111 and an upper lens sheet 112 that are respectively shown in FIGS. 10 and 11. That is, in this comparison example, two protrusions 111c of the lower lens sheet 111 are not arranged diagonally along the lens direction (a direction in which lens portions 111a are extended). Two protrusions 112c of the upper lens sheet 112 are not arranged diagonally along the lens direction (a direction in which lens portions 112a are extended). In the lower lens sheet 111, distances L31 and L32, which are the distances from the edge on the end 111b side to the respective protrusions 111c, were set to 34 mm and 40 mm, respectively. In the upper lens sheet 112, distances L31 and L32, which are the distances from the edge on the end 112b side to the respective protrusions 112c, were set to 34 mm and 40 mm, respectively.

Thereafter, the working example and the comparison example underwent a test where the respective components were stored under the high temperature and high humidity environment for 240 hours. As the storage conditions, the temperature and the humidity were set to 65° C. and 90%, respectively.

The result of this storage study shows that the warping that occurred in the lens sheet of the working example was smaller than the warping that occurred in the lens sheet of the comparison example. From this result, it can be understood that when the respective lens sheets of the working example and the comparison example are expanded in the lens directions, the expansion of the lens sheet was not hindered in the working example because the two protrusions were arranged diagonally along the lens direction. On the other hand, in the comparison example, it can be understood that the expansion of the lens sheet was hindered by the two protrusions, thereby causing the lens sheet to warp. That is, in the comparison example, the two protrusions were arranged at such positions that the expansion of the lens sheet can be hindered.

In the above-mentioned confirmation studies, BEF3 of Sumitomo 3M Limited was used for the lens sheet, and for the adhesive tape, No. 5603 (thickness: 0.03 mm) of NITTO DENKO CORPORATION was used.

It is understood that the embodiment disclosed herein is, in all aspects, illustrative and not restrictive. The scope of the present invention is defined by the scope of claims rather than the description of the embodiments above. Further, any modifications that fall within the spirit and scope equivalent to the scope of claims are included in the scope of the present invention.

DESCRIPTION OF REFERENCE CHARACTERS 1 liquid crystal display panel (display panel)
2 backlight unit
4 frame
5 light-emitting module (light source)
6 light guide plate
6a upper surface (light emerging surface)
6c side surface (light incident surface)
8 light diffusion sheet
8a end
9 lens sheet
10 rim tape (first adhesive tape)
10a wide portion
11 fastening tape (second adhesive tape)
12 step
91 lower lens sheet
91b, 92b end
91c, 92c protrusion
92 upper lens sheet

The invention claimed is:
1. A backlight unit, comprising:
a frame having a frame portion;

lens sheets disposed in an inside area of the frame portion of the frame, the lens sheets including a lower lens sheet and an upper lens sheet laminated in this order; and a first adhesive tape attached to the frame portion of the frame, wherein a portion of the first adhesive tape on a prescribed side is extended to cover an upper surface of an end of the upper lens sheet on the prescribed side, and wherein the upper lens sheet is fixed in position by said portion of the first adhesive tape on the prescribed side being affixed to the upper surface of the end of the upper lens sheet on the prescribed side, while the lower lens sheet is held without being affixed to said portion of the first adhesive tape on the prescribed side.

2. The backlight unit according to claim 1, wherein the upper lens sheet covers an upper surface of an end of the lower lens sheet on the prescribed side.

3. The backlight unit according to claim 2, wherein the end of the lower lens sheet on the prescribed side is arranged further back from the end of the upper lens sheet on the prescribed side.

4. The backlight unit according to claim 1, wherein the frame portion of the frame has a relief portion formed therein, and the lens sheets have a protrusion that engages the relief portion of the frame on an outer edge thereof, and wherein the lower lens sheet and the upper lens sheet respectively have two protrusions that are arranged diagonally along a lens direction of the respective lens sheets.

5. The backlight unit according to claim 1, further comprising:

a light diffusion sheet placed in the inside area of the frame portion of the frame; and a second adhesive tape attached to an upper surface of an end of the light diffusion sheet on the prescribed side, wherein the lower lens sheet and the upper lens sheet are laminated on an upper surface of the light diffusion sheet in this order, and wherein the light diffusion sheet is fixed in position by the second adhesive tape.

6. The backlight unit according to claim 5, wherein the second adhesive tape attached to the upper surface of the end of the light diffusion sheet on the prescribed side creates a step on the upper surface of the end of the light diffusion sheet on the prescribed side, and wherein the step created on the upper surface of the end of the light diffusion sheet on the prescribed side prevents the lower lens sheet that is disposed on the upper surface of the light diffusion sheet from moving toward the prescribed side.

7. The backlight unit according to claim 1, further comprising:

a light guide plate placed in the inside area of the frame portion of the frame, the light guide plate having an end surface on the prescribed side serving as a light incident surface; and a light source disposed so as to face the light incident surface of the light guide plate, wherein the lower lens sheet and the upper lens sheet are laminated in this order on an upper surface of the light guide plate, and wherein said portion of the first adhesive tape on the prescribed side is placed on a side close to the light source.

8. A display device, comprising:

the backlight unit according to claim 1; and a display panel that is illuminated by light from the backlight unit.

* * * * *